(12) United States Patent
Gingold et al.

(10) Patent No.: US 12,181,324 B2
(45) Date of Patent: Dec. 31, 2024

(54) VEHICLE LIQUID LEVEL TANK SENSING SYSTEM AND RELATED METHODS

(71) Applicant: G&G GROUP, LLC, Longwood, FL (US)

(72) Inventors: Herbert R. Gingold, Longwood, FL (US); Victoria E. Gingold, Longwood, FL (US); Mark Alexander McCorkle, Longwood, FL (US); Patrick Terry Davis, Oviedo, FL (US)

(73) Assignee: G & G GROUP, LLC, Longwood, FL (US)

( * ) Notice: Subject to any disclaimer, the term of this patent is extended or adjusted under 35 U.S.C. 154(b) by 408 days.

(21) Appl. No.: 17/744,839

(22) Filed: May 16, 2022

(65) Prior Publication Data
US 2022/0364900 A1 Nov. 17, 2022

Related U.S. Application Data

(60) Provisional application No. 63/189,485, filed on May 17, 2021.

(51) Int. Cl.
*G01F 23/26* (2022.01)
*G01F 23/00* (2022.01)
*G01F 23/263* (2022.01)

(52) U.S. Cl.
CPC ........ *G01F 23/263* (2013.01); *G01F 23/0007* (2013.01)

(58) Field of Classification Search
CPC .. G01F 23/263; G01F 23/0007; G01F 23/241; G01F 23/242; G01F 23/243; G01F 23/266; G01F 23/268; G01F 23/265; G01F 23/802; G07C 5/0808; G06Q 10/00; G06Q 10/06375; G06N 5/02; B60P 3/32; H04Q 9/00
See application file for complete search history.

(56) References Cited

U.S. PATENT DOCUMENTS

| | | | |
|---|---|---|---|
| 4,676,101 A | 6/1987 | Baughman |
| 5,619,560 A | 4/1997 | Shea |
| 6,138,508 A | 10/2000 | Hannan et al. |
| 6,237,412 B1 | 5/2001 | Morimoto |
| 9,476,752 B2 | 10/2016 | Mlag et al. |

(Continued)

OTHER PUBLICATIONS

KIB Electronics; M-Panel Smart Sensor (M-SS), Newmar Service School presentation, Feb. 2011, pp. 1-10 (Year: 2011).*

(Continued)

*Primary Examiner* — Francis C Gray
(74) *Attorney, Agent, or Firm* — ALLEN, DYER, DOPPELT, GILCHRIST, P.A.

(57) ABSTRACT

A liquid level sensing system for a vehicle tank may include a liquid level display including a display panel and a first number of visual indicators carried by the display panel. The system may also include capacitive sensors to be coupled to the vehicle tank to sense a second number of possible liquid levels being greater than the first number of visual indicators. In addition, the system may include a controller configured to drive the visual indicators in a modulation pattern based upon the capacitive sensors to thereby display a sensed liquid level having a resolution corresponding to the second number of possible liquid levels.

31 Claims, 8 Drawing Sheets

(56) References Cited

U.S. PATENT DOCUMENTS

| | | | |
|---|---|---|---|
| 10,429,228 B2 | 10/2019 | Robb et al. | |
| 2009/0005930 A1* | 1/2009 | Koebrick | H04Q 9/00 |
| | | | 701/36 |
| 2009/0187357 A1* | 7/2009 | Ho | G01F 23/266 |
| | | | 73/304 C |
| 2009/0301188 A1* | 12/2009 | Calcote | G01F 23/265 |
| | | | 73/304 C |
| 2009/0301189 A1 | 12/2009 | Ross, Jr. et al. | |
| 2014/0174173 A1 | 6/2014 | Chamberlin | |
| 2019/0376830 A1* | 12/2019 | Park | G01F 23/246 |
| 2020/0033176 A1 | 1/2020 | McBride et al. | |
| 2021/0063226 A1* | 3/2021 | Tang | G01F 23/266 |
| 2022/0148352 A1* | 5/2022 | Schuh | G07C 5/0808 |

OTHER PUBLICATIONS

Garnet, SeeLevel II, Holding Tank Monitors, 2023, pp. 1 & 2 (Year: 2023).*

Garnet, SeeLevel I, Holding Tank Indicators, 2007, pp. 1-13 (Year: 2007).*

ERV, Tank Monitors, 1 page, 2022, available at https://www.ervsolar.com/tank-monitors.

Thor Forums, An RV Life Community, DIY Capacity Tank Sensors, 9 pages, 2015, available at https://www.thorforums.com/forums/f27/diy-capacitive-tank-sensor-1177.html.

rvproject.com, Seelevel II Tank Monitor Upgrade, 5 pages, Jun. 6, 2020, available at http://www.rv-project.com/projects/seelevel.php.

Recpro, RV Tank Sensor Monitor Panel Kit with Probeless Adhesive Sensors, 12 pages, 2022, available at https:// www.recpro.com/rv-tank-sensor-monitor-panel-kit-with-probeless-adhesive-sensors/?campaignid=10108288062&adgroupid=107511407936&keyword=&gclid=CjwKCAjwsJ6TBhAIEiwAfl4TWKarqQXT10iw2KXWxwMDxV4vvnhpXEKQcoP1cN67orTas-8ucvxX3hoCGJgQAvD_BWE.

Charlotte Phillips, Jeffsetter Travel, 7 Best RV Tank Monitoring Systems, 20 pages, Aug. 26, 2021, available at https://www.jeffsetter.com/best-rv-tank-monitoring-systems/.

* cited by examiner

VEHICLE LIQUID LEVEL TANK SENSING SYSTEM AND RELATED METHODS

RELATED APPLICATIONS

This application claims priority to U.S. Provisional Application Ser. No. 63/189,485 filed on May 17, 2021 the contents of which are herein incorporated by reference in their entirety.

FIELD OF THE INVENTION

The present invention relates to the field of tank level sensors, and, more particularly, to a vehicle liquid level tank sensing system and related methods.

BACKGROUND

Liquid level tank sensing approaches have existed as long as liquids have been stored. From dip sticks, to floats, the need to accurately measure the amount of liquid is often a key requirement. When storing grey or black water (effluent) the need to accurately measure that level may become critical. The recreational vehicle sector has many liquid storage tanks, with different liquid contents.

The existing marketplace for recreational vehicles (RVs), for example, has a substantial installed base of low resolution resistive measuring devices for the tanks. The existing devices utilize metal probes inserted into the liquid via holes in the side of the tank. When liquid electrically shorts two probes together, the resistance seen by the display panel changes and this is indicated by three functional LEDs. A fourth LED is always illuminated, thereby providing no useful information. Therefore, this current approach has only 3 steps, or 1.5 bits of resolution. There is still a need to accurately measure the tank levels and report that information.

Capacitive sensing, for example, is a long-established technology for the sensing of liquid levels and may have implementations including in the RV sector. The existing capacitive sensing systems have some limitations when conforming to all tank shapes, and may also require a different display unit than originally installed to operate. Improving the application of the tank sensing devices, such as capacitive sensing devices, may be desirable.

SUMMARY

A liquid level sensing system for a vehicle tank is disclosed. The system may include a liquid level display comprising a display panel and a first number of visual indicators carried by the display panel. The system may also include a plurality of capacitive sensors to be coupled to the vehicle tank to sense a second number of possible liquid levels being greater than the first number of visual indicators. In addition, the system may include a controller configured to drive the visual indicators in a modulation pattern based upon the plurality of capacitive sensors to thereby display a sensed liquid level having a resolution corresponding to the second number of possible liquid levels.

The liquid level display may be configured to operate with a plurality of resistive sensors to be coupled to the vehicle tank, and the controller may also be configured to drive the individual visual indicators compatible with operation of the plurality of resistive sensors. In other words, the controller may be compatible with existing resistive liquid level displays, and may be used in a retrofit application, for example.

The first number of visual indicators may be sequentially arranged on the display panel corresponding to respective tank fill level ranges, and the controller may be configured to drive a given visual indicator to flash or remain on solid based upon the modulation pattern.

The controller may be configured to drive a given visual indicator to flash at one of a plurality of predetermined rates based upon the modulation pattern. The first number of visual indicators may comprise a first visual indicator corresponding to a one-third tank fill level range, a second visual indicator corresponding to a two-thirds tank fill level range, a third visual indicator corresponding to a full tank fill level range, and a fourth visual indicator corresponding to a tank overflow fill level range.

The controller may be configured to drive a given visual indicator according to the modulation pattern to flash once per second when the sensed liquid level has reached one-third of a corresponding tank fill level range, flash twice per second when the sensed liquid level has reached two-thirds of the corresponding tank fill level range, flash thrice per second when the sensed liquid level has reached the corresponding tank fill level range, and remain on solid when the sensed liquid level has reached beyond the corresponding tank fill level range. Each of the first number of visual indicators may comprise a light emitting diode (LED), or a segment of an LCD, for example.

In addition, the system may include a digital display unit where the controller may be configured to drive the digital display unit to display the sensed liquid level. The digital display unit may include a wireless interface configured to transmit the sensed liquid level to a mobile computing device, such as a cellphone or tablet.

The liquid level sensing system may comprise a plurality of unshielded wire pairs, with each unshielded wire pair extending between the controller and a respective capacitive sensor. Each unshielded wire pair may comprise a signal wire coupled between the controller and the respective capacitive sensor, and a compensation wire coupled to the controller and electrically floating at the respective capacitive sensor. In these embodiments, the controller may be configured to subtract a capacitance of the compensation wire from the signal wire to provide more robust and accurate measurements.

Another aspect is directed to a liquid level sensing method for a vehicle comprising a tank and a liquid level display comprising a display panel and a first number of visual indicators carried by the display panel. The method may include operating a plurality of capacitive sensors coupled to the vehicle tank to sense a second number of possible liquid levels being greater than the first number of visual indicators, and operating a controller to drive the individual visual indicators in a modulated pattern based upon the plurality of capacitive sensors to thereby display a sensed liquid level having a resolution corresponding to the second number of possible liquid levels.

The method may include operating the controller to drive a given visual indicator to flash at one of a plurality of predetermined rates based upon the modulation pattern, and operating the controller to drive a digital display unit to display the sensed liquid level.

Yet another aspect is directed to a liquid level sensing system for a vehicle tank and associated liquid level display. The system may include a plurality of capacitive sensors to be coupled to the vehicle tank, and a controller configured to drive the display based upon the plurality of capacitive sensors. The system may also include a plurality of unshielded wire pairs, with each unshielded wire pair extending between the controller and a respective capacitive sensor. In addition, each unshielded wire pair may comprise a signal wire coupled between the controller and the respective capacitive sensor, and a compensation wire coupled to the controller and electrically floating at the respective capacitive sensor. The controller may be configured to subtract a capacitance of the compensation wire from the signal wire.

DETAILED DESCRIPTION

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
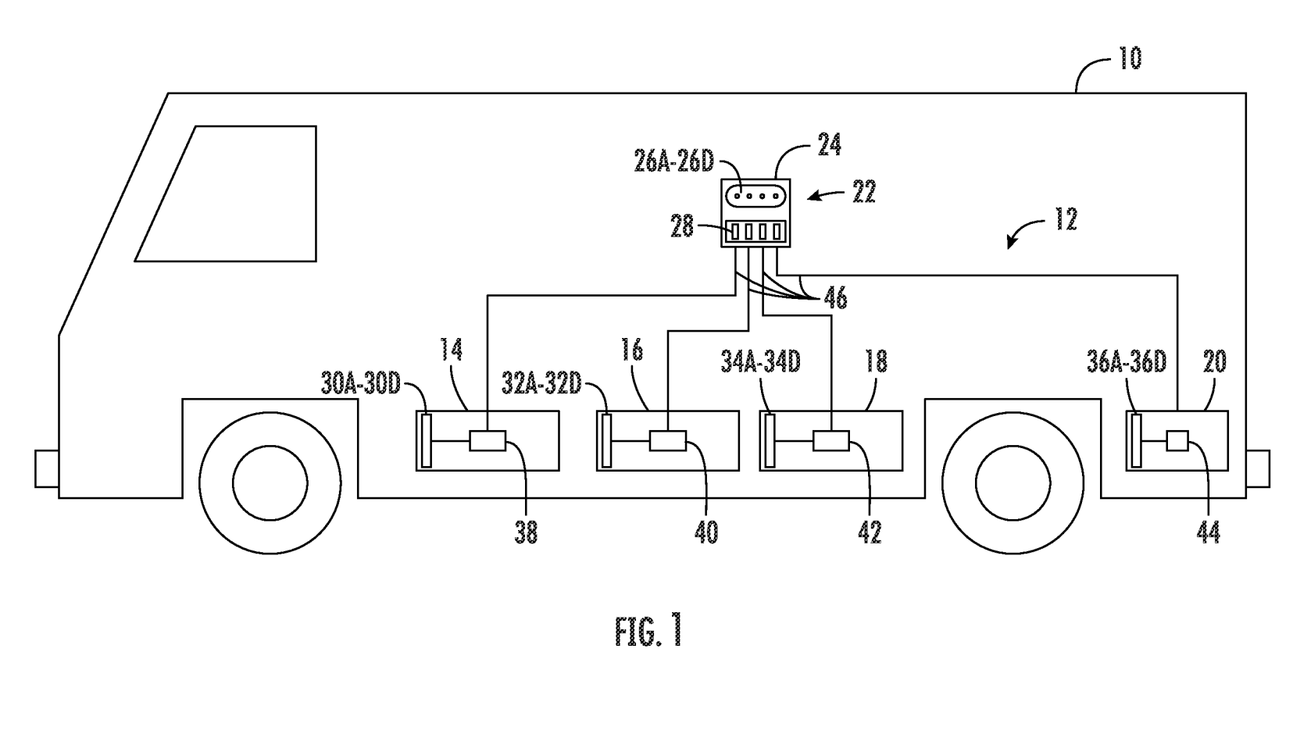
FIG. 1 is a schematic diagram of a liquid level sensing system in accordance with the present invention installed on a recreational vehicle.

Referring now to FIG. 1, a recreational vehicle (RV) 10, as an exemplary vehicle, has a liquid level sensing system 12. The typical RV 10 may include four tanks 14, 16, 18, 20 to which the liquid sensing system 12 is coupled. For example, a first tank 14 may be for fresh water, a second tank 16 for black water, a third tank 18 for grey water, and a fourth tank 20 also for grey water. Such tanks are typically formed of plastic or other dielectric material to facilitate capacitive sensing from an exterior of the tank. Such a tank will also typically include a ground electrode at the bottom thereof.

As those of skill in the art will appreciate, the RV 10 could have only one tank or any combination or number of tanks depending on the vehicle. Accordingly, the system 12 is compatible to being configured for use with one or more tanks and in any type of vehicle. In addition, the vehicle could also be a boat, aircraft or other vehicle having at least one tank.

The liquid sensing system 12 includes a liquid level display 22 having a display panel 24 and a first number of individual visual indicators 26 carried by the display panel 24. A plurality of switches 28 is also carried by the display panel 24 and is configured to select which tank to display the liquid level.

A plurality of capacitive sensors 30A-30D, 32A-32D, 34A-34D, 36A-36D are coupled to each of the respective tanks 14, 16, 18, 20. In addition, a controller 38, 40, 42, 44 is coupled to the respective plurality of capacitive sensors 30A-30D, 32A-32D, 34A-34D, 36A-36D. Each of the controllers 38, 40, 42, 44 are illustratively coupled to the liquid level display 22 and may use level signal wiring 46 from existing probe type sensors to facilitate retrofit installations.

The system 12 may use a pulse per second method to indicate higher resolution data, such as within the individual visual indicators 26A-26D (e.g. LEDs, or LCD segments) available in the existing display panel 24 to display the linear resolution of the liquid level data. For example, as a tank fills with liquid the system 12 will code the linear result into a series of resistive pulses of the 12V DC signal thereby causing one of the existing individual visual indicators 26A-26D to flash, or remain solid, as required.

The system 12 may pulse the individual visual indicators 26A-26D up to three pulses per second, for example, to indicate the level of liquid in the respective tank 14. If the respective tank is empty, all of the individual visual indicators are dark (i.e., turned off). As described in an example below, the respective tank fills and the value is determined to be increasing, the liquid level sensing system 12 begins flashing the assigned visual indicator at a rate proportional to the level of the respective tank.

Figure 2:
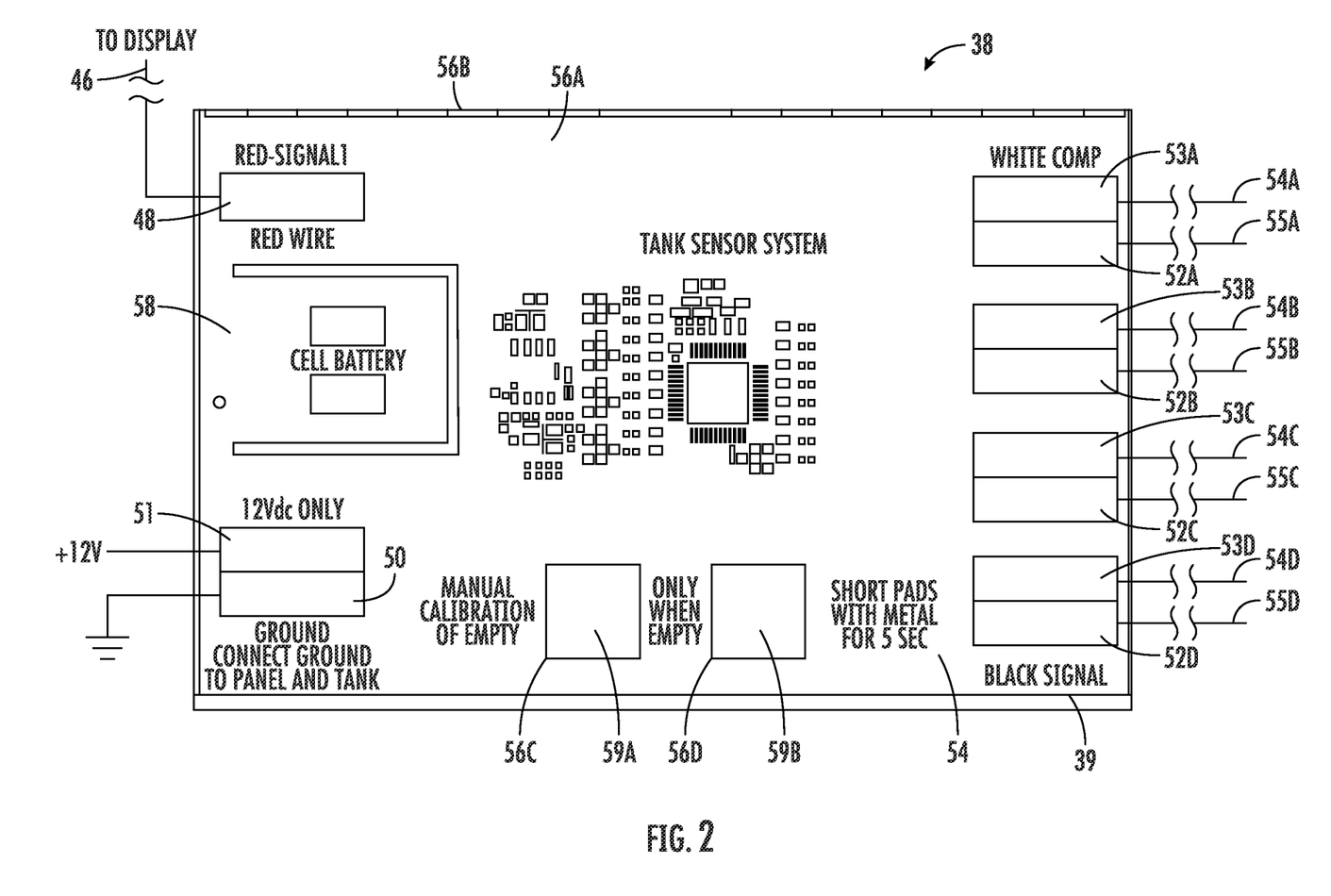
FIG. 2 is a plan view of a controller of the liquid level sensing system in accordance with the present invention.
Figure 3:
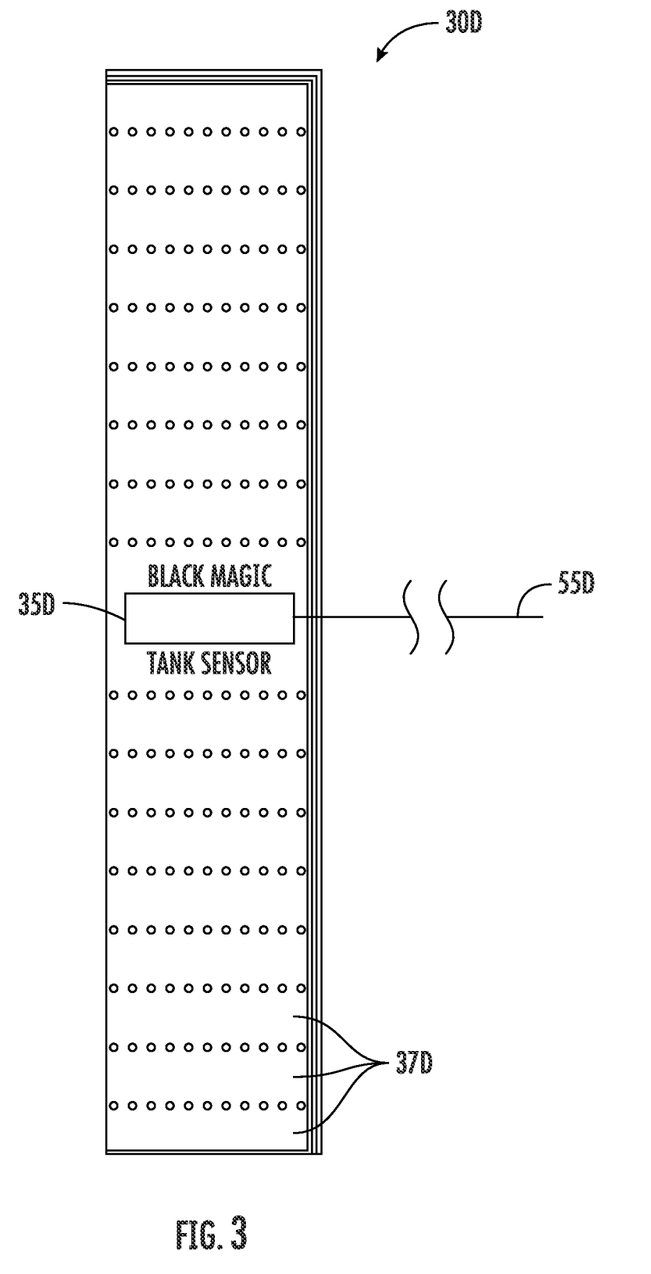
FIG. 3 is a plan view of a capacitive sensor of the liquid level sensing system.
Figure 4:
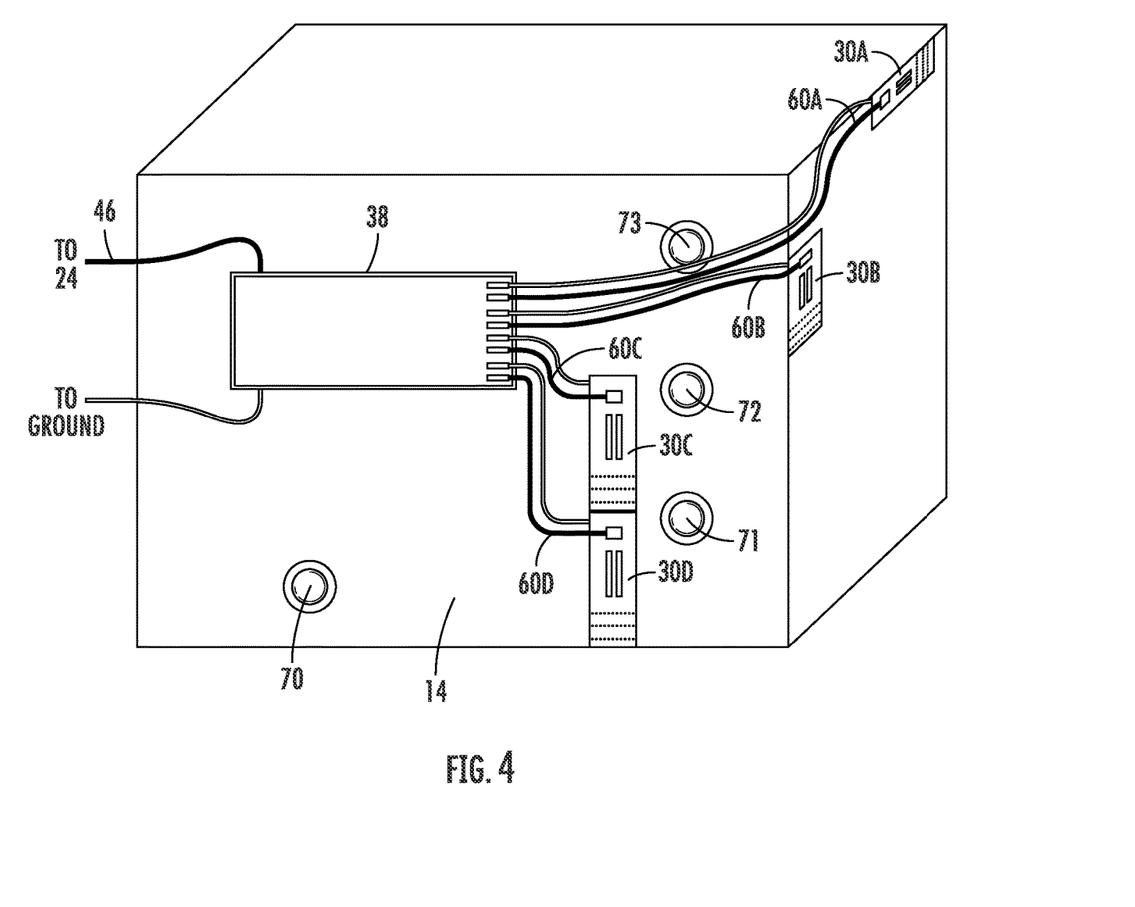
FIG. 4 is a diagram of the liquid level sensing system in accordance with the present invention installed on a liquid tank.

With additional reference to FIGS. 2-4, an exemplary controller 38 of the liquid level sensing system 12 is further described. The controller 38 includes a circuit board 39 that mounts a level signal wire connector 48 for coupling the level signal wiring 46 from the controller 38 to the liquid level display 22. The controller 38 also includes a ground connector 50 for connecting the controller 38 to a ground wire, such as chassis ground, and a power connector 51 to be coupled to +12V vehicle power, for example. Metal pads 59A-59B may be used for calibration purposes.

The controller 38 illustrative includes a plurality of capacitive signal sensor wire connectors 52A-52D for coupling a respective plurality of capacitive sensors 30A-30D to the controller 38. The signal wire connectors 52A-52D may be simple plug-in type connectors for an unshielded signal wire 55A-55D coupled to a respective sensor.

The controller may also include similar connectors 52A-52D for unshielded compensation wires 54A-54D that extend parallel with respective signal wires and which remain unterminated, or electrically floating, at the respective sensors 30A-30D. These compensation wires 54A-54D will have a capacitance due to adjacent structures, etc., that can be sensed and subtracted by the processor or microcontroller 54 from the total capacitance sensed by corresponding signal wires 55A-55D to provide greater signal accuracy as will be appreciated by those skilled in the art. In other words, this is a compensation channel that is configured to measure the stray capacitance seen by the wire coupled to the capacitive sensor. The compensation value is subtracted from the capacitive sensor value to isolate the value the capacitive sensor is generating. Even if the stray capacitance changes, the capacitive sensor value remains. The compensation wire may also be used to provide sensor connection diagnostics. The compensation wire at empty should be larger than the sensor value, and neither value should be zero. If either value is zero, then the wire is not connected at the controller. If the values are within 10% of the same value, then the wire is not connected at the capacitive sensor.

The arrangement of the capacitive sensors 30A-30D relative to the controller 38 and tank 14 is perhaps best shown in FIG. 4. Each of the capacitive sensors 30A-30D corresponds to a tank fill level range. For example, capacitive sensor 30A corresponds to the tank overflow fill level range, capacitive sensor 30B corresponds to the tank full fill level range, capacitive sensor 30C corresponds to the tank two-thirds tank fill level range, and sensor 30D corresponds to the tank one-third fill level range. The plurality of capacitive sensors 30A-30D may be coupled to the controller 38 via solid core 22-gauge wire pairs 60A-60D, for example.

The plurality of capacitive sensors 30A-30D are configured to sense a second number of possible liquid levels being greater than the first number of individual visual indicators 26A-26D. The controller 38 is configured to drive the visual indicators 26A-26D in a modulation pattern based upon the plurality of capacitive sensors 30A-30D to thereby display a sensed liquid level having a resolution corresponding to the second number of possible liquid levels, in other words, to provide a higher resolution.

The controller 38 includes a processor microcontroller 54 programmed with computer executable instructions. The instructions cause the microcontroller 54 to determine a liquid level in the tank 14 and to drive individual visual indicators in a modulation pattern based upon the plurality of capacitive sensors 30A-30D to display a sensed liquid level.

The microcontroller 54 is coupled to a plurality of field-effect transistors 56A-56D arranged to allow the activation of the microcontroller 54 and to transmit a level signal to the liquid level display 22 to indicate the sensed liquid level of the tank 14. The controller 38 may be powered by a battery 58 stored on the controller 38 or receive power from a remote power source as those of skill in the art can appreciate.

Figure 5:
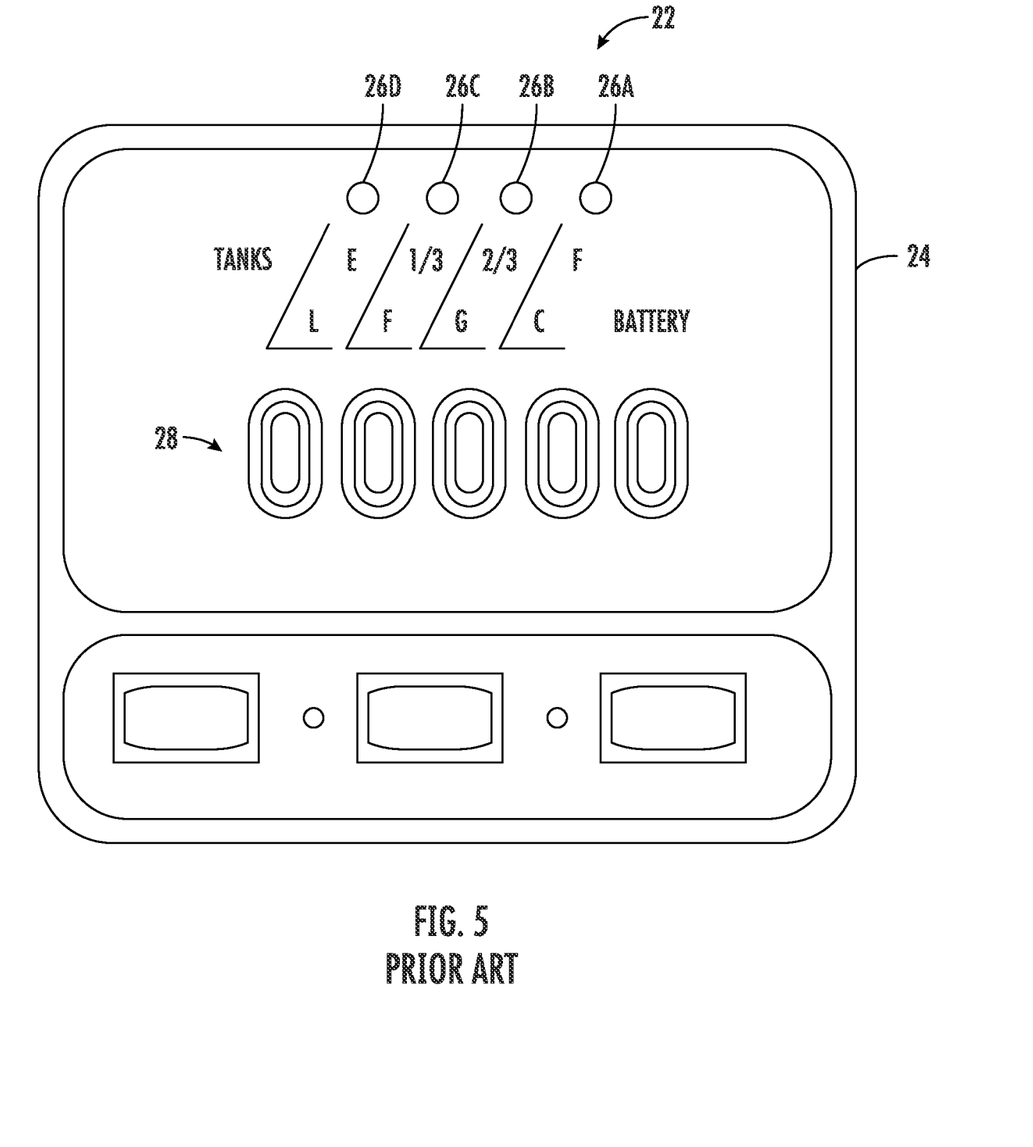
FIG. 5 is a view of a prior art liquid level display panel.

The first number of individual visual indicators 26A-26D is sequentially arranged on the display panel 24 corresponding to respective tank fill level ranges, and the controller 38 is configured to drive a given individual visual indicator to flash or remain on solid based upon the modulation pattern. The controller 38 is also configured to drive a given individual visual indicator to flash at one of a plurality of predetermined rates based upon the modulation pattern. The first number of individual visual indicators comprises a first visual indicator 26D corresponding to a one-third tank fill level range, a second visual indicator 26C corresponding to a two-thirds tank fill level range, a third visual indicator 26B corresponding to a full tank fill level range, and a fourth visual indicator 26A corresponding to a tank overflow fill level range.

The controller 38 may be configured to drive a given individual visual indicator according to the modulation pattern to flash once per second when the sensed liquid level has reached one-third of a corresponding tank fill level range, flash twice per second when the sensed liquid level has reached two-thirds of the corresponding tank fill level range, flash thrice per second when the sensed liquid level has reached the corresponding tank fill level range, and remain on solid when the sensed liquid level has reached beyond the corresponding tank fill level range. Each of the first number of individual visual indicators 26A-26D may comprise a light emitting diode (LED).

For example, in operation one flash per second of the one-third visual indicator 26D represents the first $\frac{1}{9}^{th}$ of the total tank volume. After the tank is $\frac{2}{9}^{ths}$ full, the display panel 24 would flash the one-third visual indicator twice, and after the tank is $\frac{3}{9}^{ths}$ full, the display panel 24 would flash the one-third visual indicator three times, and subsequently that visual indicator 26D would remain solid as the tank continued to fill. Accordingly, the total resolution displayed by the visual indicators (LEDs) 26A-26D would increase from 1.5 bits to 6.0 bits. Moreover, higher resolution than one-ninths can be displayed with more pulses per second, pulse patterns, and linear flash rate ramping in other embodiments.

The capacitive sensor 30D (FIG. 3) is configured to be coupled to the controller 38 via a 22-gauge solid core signal wire 55D inserted into the connector 35D. The capacitive sensors 30A-30D are length adjustable by cutting or breaking off the adjustment sections 37D.

The capacitive sensor arrangement allows the sensors 30A-30D to be displaced in lateral positions, while the combined sensor comprises a full linear coverage of the vertical dimension. The capacitive sensors 30A-30D can be of different lengths and overlap in horizontal coverage. For example, the capacitive sensors 30A-30D may have a 45-degree hatch pattern of 7 mil traces.

A typical installation of the controller 38 and the capacitive sensors 30A-30D is further explained with reference to FIG. 4. For example, the controller 38 may be attached to a sidewall of the tank 14 by an adhesive. The capacitive sensors 30A-30D may be connected to the controller via 22-gauge solid core wire pairs 60A-60D. The capacitive sensors 30A-30D are configured to be secured to a surface or orientation to cover the entire height of the tank 14 and coupled to the controller 38 as explained above.

A typical existing liquid level display 22 is explained with reference to FIG. 5. The existing liquid level display 22 includes a display panel 24 and a first number of individual visual indicators 26A-26D carried by the display panel 24. In a particular aspect, each of the individual visual indicators 26A-26D are light emitting diodes (LEDs), although in other embodiments segmented LCDs or other similar indicators could be used. The LEDs 26A-26D correspond to the tank fill level. The standard legend is "E ⅓ ⅔ F" which can be modified in a retrofit application using the capacitive sensing arrangement as described herein. The switches 28 carried by the display panel 24 are configured to select which tank 14, 16, 18, 20 to display the liquid fill level and turn on the measurement signal for the selected tank.

Figure 6:
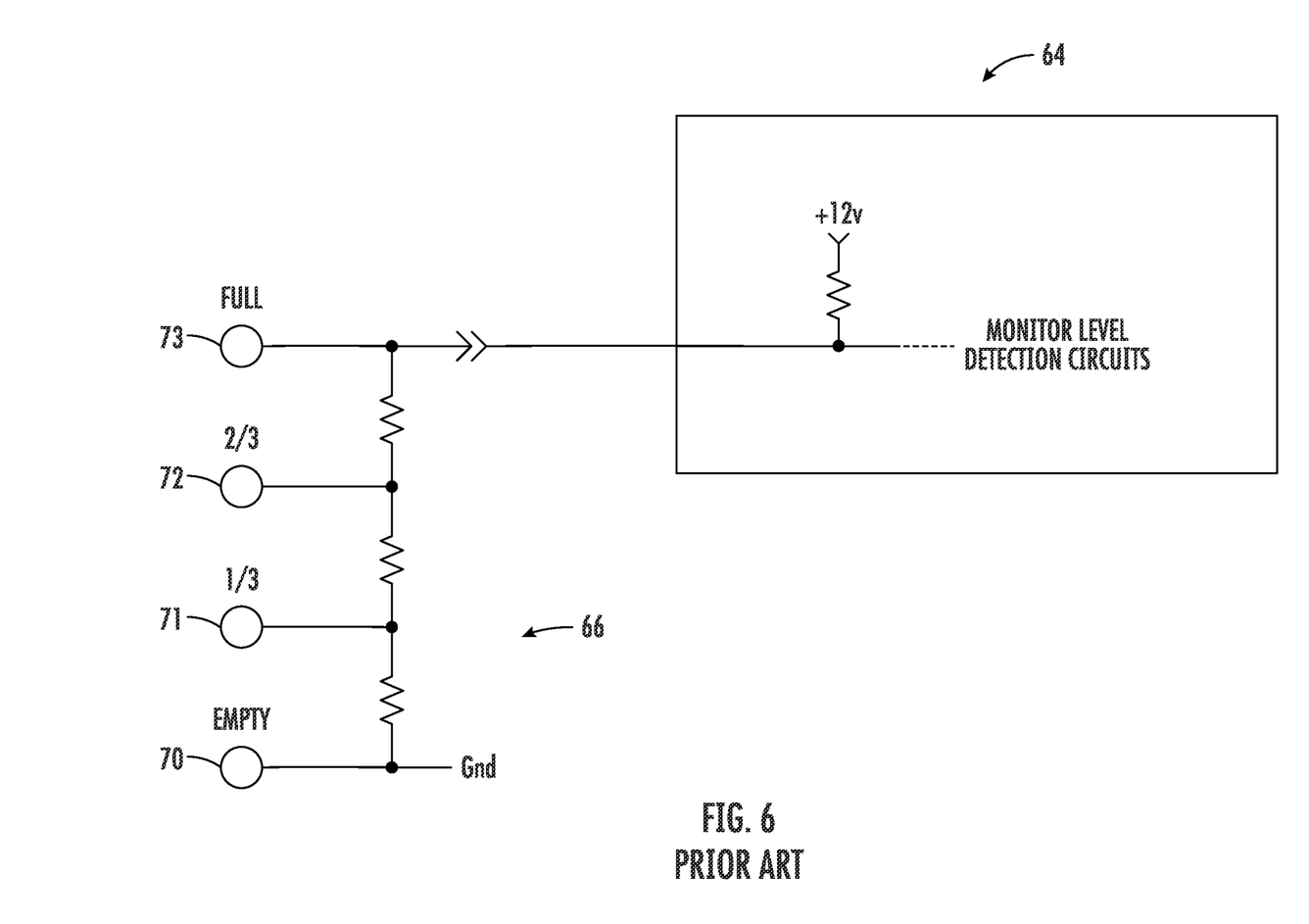
FIG. 6 is a schematic circuit diagram of a tank level sensing system according to the prior art.

An existing prior art sensing circuit 64 for measuring liquid levels in a tank is explained with reference to FIG. 6. The prior art sensing circuit 64 is used with sensing metal probes 70-73 (also FIG. 4) positioned at sequential heights inside the tank. In operation, approximately 12V to 8V is applied to the external resistor network 66 when the tank sensing signal is sent. The resulting electrical short circuit changes the resistance seen by the sensing circuit 64 when the sensing metal probes within the tank are covered in liquid. For example, a reduced voltage indicates increased liquid volume as a result of the top sensing metal probe being shorted to the bottom most sensing metal probe. The resolution of this prior art measurement circuit is limited to 3 steps, or 1.5 bits. In addition, the resistance of the liquid and debris within the tank may cause erroneous readings.

Figure 7:
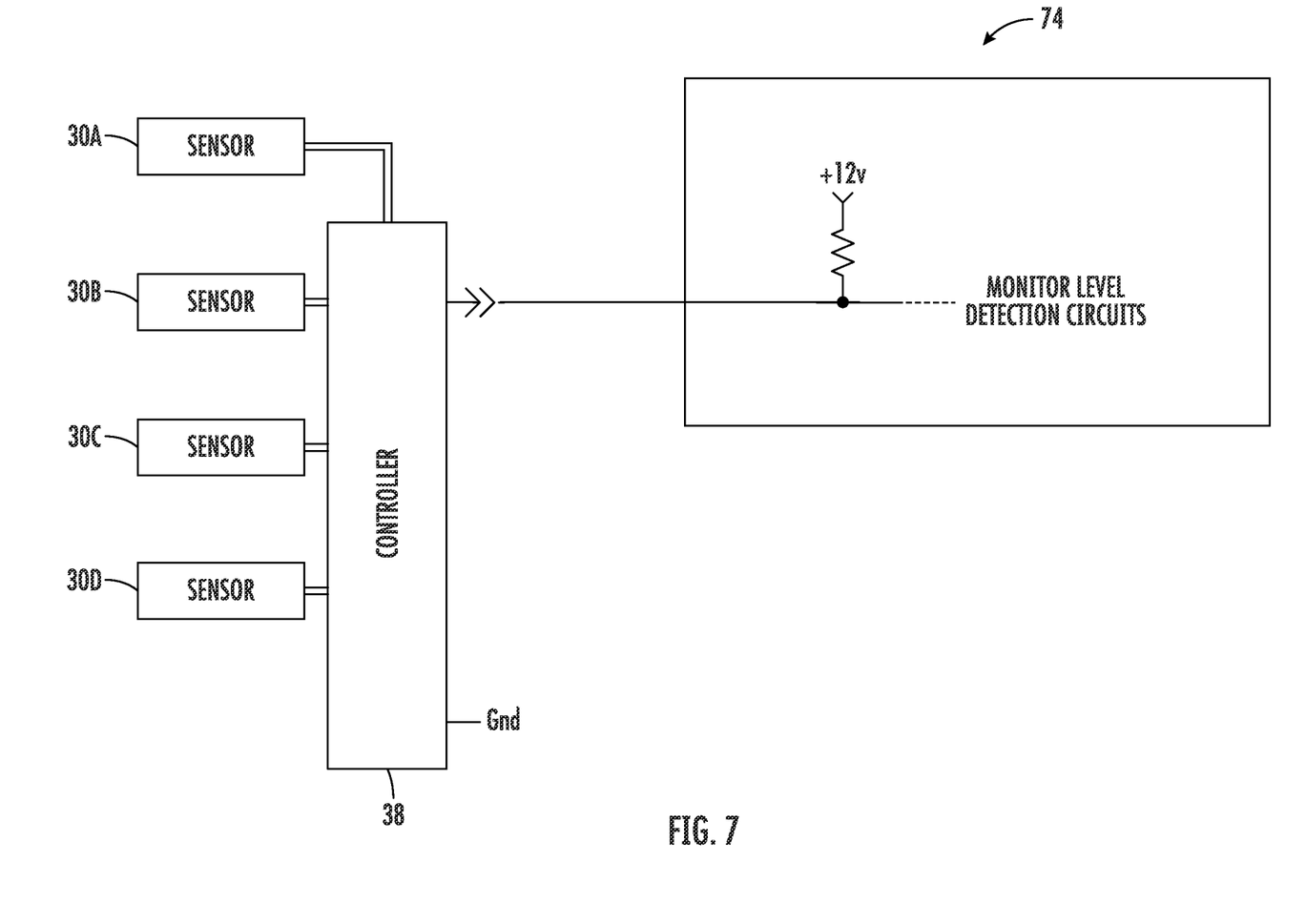
FIG. 7 is a schematic circuit diagram of the liquid level sensing system in accordance with the present invention.

FIG. 7 shows a schematic circuit diagram of the capacitive liquid level sensing circuit 74 replacing the existing prior art resistive circuit. In operation, approximately 12V to 8V is applied to the controller 38 when the tank sensing signal is sent by the liquid level display 22, which activates the controller 38 and measures the liquid with capacitive sensors 30A-30D. The controller 38 modulates the sensing signal to cause the liquid level display 22 to operate in both a normal and an enhanced information manner.

The liquid level display 22 may also be configured to operate with a plurality of resistive sensors to be coupled to the tank, and the controller 38 may also be configured to drive the individual visual indicators 26A-26D compatible with operation with the plurality of resistive sensors. In other words, the controller 38 may provide respective voltage signals/pulses similar to the resistive level measurement approach, may be used in a retrofit application with an existing display 22.

Figure 8:
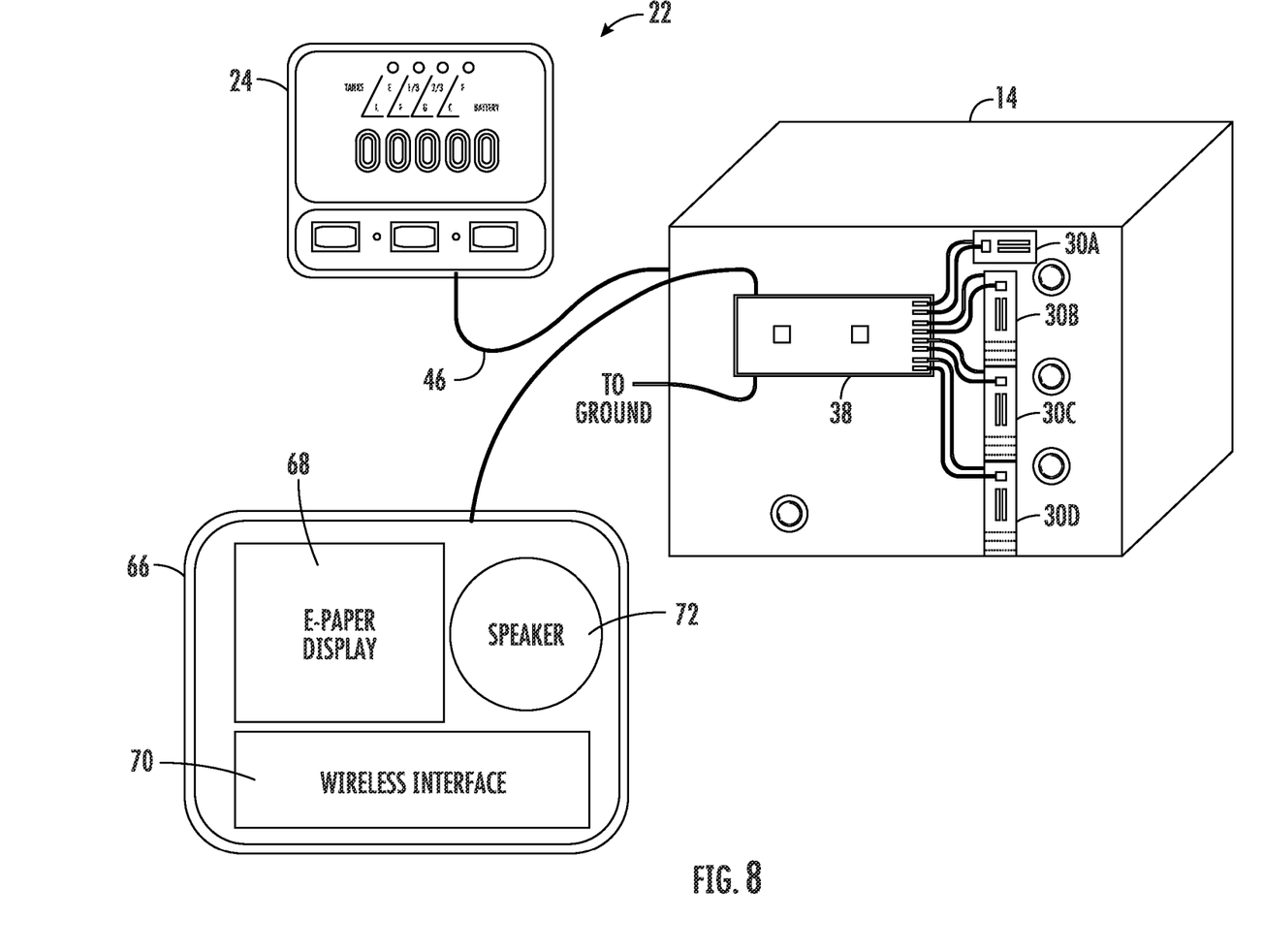
FIG. 8 is a diagram of the liquid level sensing system having a digital display unit.

In addition, the system 12 may include a digital display unit 66 as shown in FIG. 8, where the controller 38 may be configured to drive the digital display unit 66 to display the sensed liquid level. The digital display unit 66 may include a wireless interface configured to transmit the sensed liquid level to a mobile computing device.

When the digital display unit 66 communicates with the controller 38, it does it electronically, getting results in 100 ms or less. The digital display unit 66 may include digital signage, such as the E-paper display 68 for displaying the tank values. The digital display unit 66 may also have a wireless interface 70 that transmits the data to a mobile computing device or computer. The digital display unit 66 may also have a speaker 72 to produce audible results.

The liquid level sensing system 12 greatly improves the measurement and display capabilities of the typical RV liquid tank measurement system. The sensing system 12 uses capacitive sensors 30A-30D arranged in a piecewise linear fashion that can be shortened to conform to the available surfaces. The combination of the capacitive sensors 30A-30D creates a linear measurement in height but each capacitive sensor may be displaced laterally. Also, the capacitive sensors 30A-30D need not be identical in length to generate a linear result.

In operation, the liquid level sensing system 12 is typically in a stop mode or "off", minimizing required power. The sensing system 12 may be activated when the user presses one of the switches 28 on the display panel 24. This places a reference 12 volts DC reference signal that the controller 38 detects and monitors it to allow for instructions to be received and when to return to stop mode. While activated the liquid level sensing system 12 measures and calculates the level sensing data and commands the liquid level display 22 via an array of FETs 56A-56D and resistors, that control the 12 volt DC reference signal to a lower voltage level, allowing the system 12 to have digital control of the existing liquid level display 22.

The liquid level data is linearized by a calibration procedure and the first activation of all the capacitive sensors 30A-30D. The calibration procedure uses the existing switches 28 on the display panel 24 to signal the liquid level sensing system 12 to calibrate the tank as empty by a sequence of activation signals and the system 12 indicates feedback to the user via the liquid level display 22. The calibration procedure is complete after filling the tank 14 and the capacitive sensors 30A-30D have been activated for the first time.

Another aspect is directed to a liquid level sensing method for a vehicle comprising a vehicle tank 14 and a liquid level display 22 comprising a display panel 24 and a first number of visual indicators 26 carried by the display panel 24. The method includes operating a plurality of capacitive sensors 30A-30D coupled to the vehicle tank 14 to sense a second number of possible liquid levels being greater than the first number of individual visual indicators 26A-26D, and operating the controller 38 configured to drive the individual visual indicators 26A-26D in a modulated pattern based upon the plurality of capacitive sensors 30A-30D to thereby display a sensed liquid level having a resolution corresponding to the second number of possible liquid levels.

The liquid level display 22 may be configured to operate with a plurality of resistive sensors to be coupled to the vehicle tank 14, and the controller 38 may be configured to drive the individual visual indicators 26A-26D compatible with operation with the plurality of resistive sensors.

The first number of individual visual indicators 26A-26D is sequentially arranged on the display panel 24 corresponding to a tank fill level range, where operating the controller 38 drives a given individual visual indicator to flash or remain on solid based upon the modulation pattern.

The method may include operating the controller 38 to drive a given individual visual indicator to flash at one of a plurality of predetermined rates based upon the modulation pattern, and operating the controller 38 to drive a digital display unit 66 to display the sensed liquid level.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A liquid level sensing system for a vehicle tank comprising:
    a liquid level display comprising a display panel and a first number of visual indicators carried by the display panel;
    a plurality of capacitive sensors to be coupled to the vehicle tank to sense a second number of possible liquid levels being greater than the first number of visual indicators; and
    a controller configured to drive the visual indicators in a modulation pattern based upon the plurality of capacitive sensors to thereby display a sensed liquid level having a resolution corresponding to the second number of possible liquid levels.

2. The liquid level sensing system of claim 1, wherein the liquid level display is configured to operate with a plurality of resistive sensors to be coupled to the vehicle tank; and wherein the controller is configured to drive the visual indicators compatible with operation with the plurality of resistive sensors.

3. The liquid level sensing system of claim 1, wherein the first number of visual indicators is sequentially arranged on the display panel corresponding to respective tank fill level ranges.

4. The liquid level sensing system of claim 3, wherein the controller is configured to drive a given visual indicator to flash or remain on solid based upon the modulation pattern.

5. The liquid level sensing system of claim 3, wherein the controller is configured to drive a given visual indicator to flash at one of a plurality of predetermined rates based upon the modulation pattern.

6. The liquid level sensing system of claim 3, wherein the first number of visual indicators comprises:
    a first visual indicator corresponding to a one-third tank fill level range;
    a second visual indicator corresponding to a two-thirds tank fill level range;
    a third visual indicator corresponding to a tank full fill level range; and
    a fourth visual indicator corresponding to a tank overflow level range.

7. The liquid level sensing system of claim 6, wherein the controller is configured to drive a given visual indicator according to the modulation pattern to:

flash once per second when the sensed liquid level has reached one-third of a corresponding tank fill level range;

flash twice per second when the sensed liquid level has reached two-thirds of the corresponding tank fill level range;

flash thrice per second when the sensed liquid level has reached the corresponding tank fill level range; and remain on solid when the sensed liquid level has reached beyond the corresponding tank fill level range.

8. The liquid level sensing system of claim 1, wherein each of the first number of visual indicators comprises a respective light emitting diode (LED).

9. The liquid level sensing system of claim 1, comprising a digital display unit; and wherein the controller is configured to drive the digital display unit to display the sensed liquid level.

10. The liquid level sensing system of claim 9, wherein the digital display unit comprises a wireless interface configured to transmit the sensed liquid level to a mobile computing device.

11. The liquid level sensing system of claim 1, comprising a plurality of unshielded wire pairs, each unshielded wire pair extending between the controller and a respective capacitive sensor.

12. The liquid level sensing system of claim 11, wherein each unshielded wire pair comprises:

a signal wire coupled between the controller and the respective capacitive sensor; and a compensation wire coupled to the controller and electrically floating at the respective capacitive sensor.

13. The liquid level sensing system of claim 12, wherein the controller is configured to subtract a capacitance of the compensation wire from the signal wire.

14. A liquid level sensing system for a vehicle comprising a tank and a liquid level display comprising a display panel and a first number of visual indicators carried by the display panel, the liquid level sensing system comprising:

a plurality of capacitive sensors to be coupled to the vehicle tank to sense a second number of possible liquid levels being greater than the first number of visual indicators; and a controller configured to drive the visual indicators in a modulation pattern based upon the plurality of capacitive sensors to thereby display a sensed liquid level having a resolution corresponding to the second number of possible liquid levels.

15. The liquid level sensing system of claim 14, wherein the liquid level display is configured to operate with a plurality of resistive sensors to be coupled to the vehicle tank; and wherein the controller is configured to drive the visual indicators compatible with operation with the plurality of resistive sensors.

16. The liquid level sensing system of claim 14, wherein the first number of visual indicators is sequentially arranged on the display panel corresponding to respective tank fill level ranges.

17. The liquid level sensing system of claim 16, wherein the controller is configured to drive a given visual indicator to flash or remain on solid based upon the modulation pattern.

18. The liquid level sensing system of claim 16, wherein the controller is configured to drive a given visual indicator to flash at one of a plurality of predetermined rates based upon the modulation pattern.

19. The liquid level sensing system of claim 14, comprising a digital display unit; and wherein the controller is configured to operate the digital display unit to display the sensed liquid level.

20. The liquid level sensing system of claim 19, wherein the digital display unit comprises a wireless interface configured to transmit the sensed liquid level to a mobile computing device.

21. The liquid level sensing system of claim 14, comprising a plurality of unshielded wire pairs, each unshielded wire pair extending between the controller and a respective capacitive sensor.

22. The liquid level sensing system of claim 21, wherein each unshielded wire pair comprises:

a signal wire coupled between the controller and the respective capacitive sensor; and a compensation wire coupled to the controller and electrically floating at the respective capacitive sensor.

23. The liquid level sensing system of claim 22, wherein the controller is configured to subtract a capacitance of the compensation wire from the signal wire.

24. A liquid level sensing method for a vehicle comprising a tank and a liquid level display comprising a display panel and a first number of visual indicators carried by the display panel, the liquid level sensing method comprising:

operating a plurality of capacitive sensors coupled to the vehicle tank to sense a second number of possible liquid levels being greater than the first number of visual indicators; and operating a controller to drive the visual indicators in a modulated pattern based upon the plurality of capacitive sensors to thereby display a sensed liquid level having a resolution corresponding to the second number of possible liquid levels.

25. The method of claim 24, wherein the liquid display is configured to operate with a plurality of resistive sensors to be coupled to the vehicle tank; and wherein the controller is configured to drive the visual indicators compatible with operation with the plurality of resistive sensors.

26. The method of claim 24, wherein the first number of visual indicators is sequentially arranged on the display panel corresponding to a tank fill level range.

27. The method of claim 26, wherein operating the controller drives a given visual indicator to flash or remain on solid based upon the modulation pattern.

28. The method of claim 26, wherein operating the controller drives a given visual indicator to flash at one of a plurality of predetermined rates based upon the modulation pattern.

29. The method of claim 26, comprising operating the controller to drive a digital display unit to display the sensed liquid level.

30. A liquid level sensing system for a vehicle tank and an associated liquid level display, the liquid level system comprising:

a plurality of capacitive sensors to be coupled to the vehicle tank;

a controller configured to drive the display based upon the plurality of capacitive sensors; and a plurality of unshielded wire pairs, each unshielded wire pair extending between the controller and a respective capacitive sensor, each unshielded wire pair comprising a signal wire coupled between the controller and the respective capacitive sensor, and a compensation wire coupled to the controller and electrically floating at the respective capacitive sensor;

the controller configured to subtract a capacitance of the compensation wire from the signal wire.

31. The liquid level sensing system of claim 30, wherein the liquid level display is configured to operate with a plurality of resistive sensors to be coupled to the vehicle tank; and wherein the controller is configured to drive the liquid level display compatible with operation with the plurality of resistive sensors.

* * * * *